INVENTOR.
Walter F. Gerdes
BY
Earl D. Ayers
AGENT

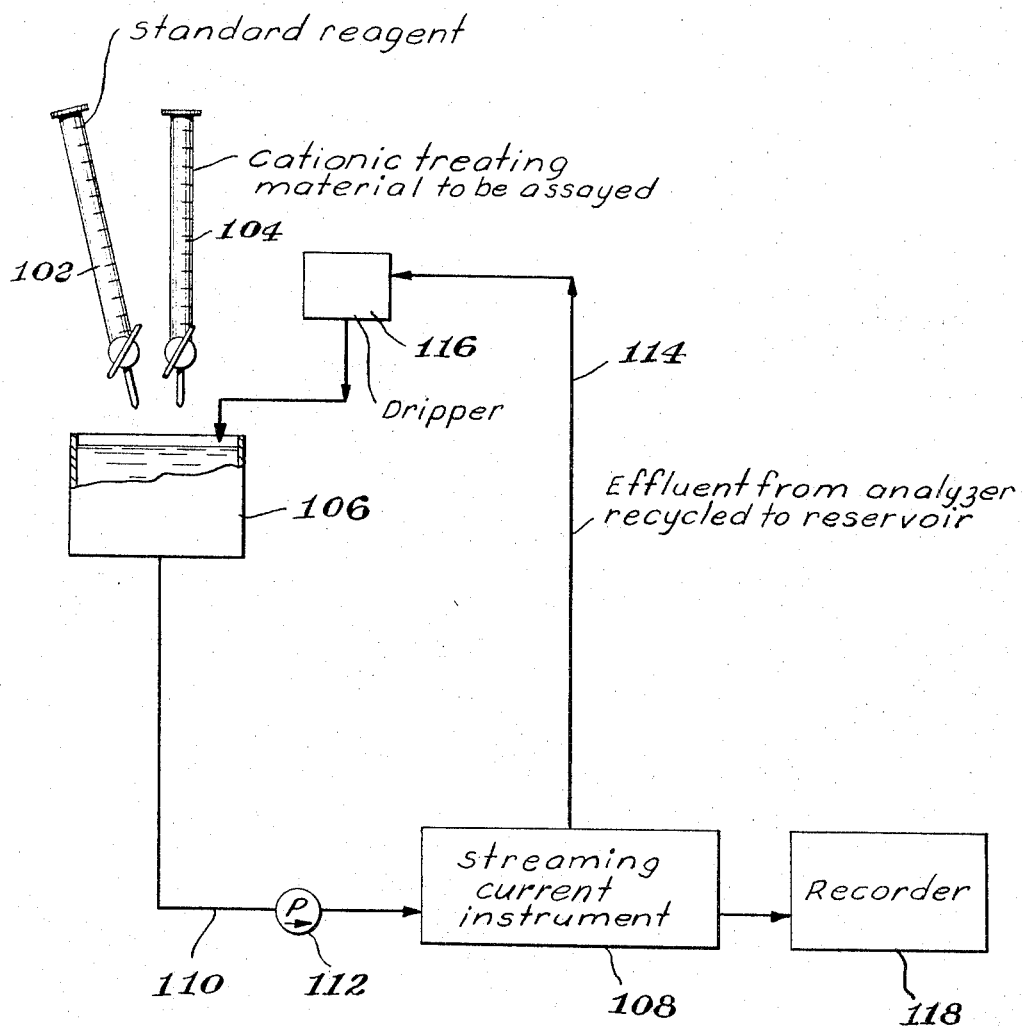

_United States Patent Office_

3,368,144
Patented Feb. 6, 1968

3,368,144
APPARATUS FOR MEASURING CHARGE CONDITION WITHIN A SOLUTION
Walter F. Gerdes, Lake Jackson, Tex., assignor to The Dow Chemical Company, Midland, Mich., a corporation of Delaware
Continuation-in-part of application Ser. No. 315,538, Oct. 11, 1963. This application Mar. 4, 1966, Ser. No. 536,544
22 Claims. (Cl. 324—32)

This application is a continuation-in-part of my copending application Ser. No. 315,538, filed Oct. 11, 1963, for Control Apparatus and System, now abandoned.

This invention relates to novel apparatus for developing an alternating current electrical signal which can be utilized in the continuous regulation of flocculation of aqueous suspension of finely divided charged particles and for other uses such as detecting electrical charges present in a stream having ions, charged molecules, or colloidal particles therein.

It is conventional practice in clarifying aqueous systems containing suspended particles to employ a flocculation operation. Once flocculated, the suspended particles can be separated from their water medium by sedimentation, filtration, flotation, centrifugation, or one or more of the foregoing physical separatory processes in combination. Conventionally, the flocculation operation is promoted by the use of flocculating chemicals such as alum, ferric chloride and various polymeric materials such as water-soluble cationic and anionic organic polyelectrolytes. Aqueous suspensions of finely divided particles are encountered in natural or raw water supplies such as rivers and lakes and in municipal and industrial wastes, which latter systems include a substantial proportion of suspended organic particles.

In a typical flocculation process for the clarification of municipal sewage, a water-soluble cationic flocculating chemical is added to the sewage. The sewage normally comprises suspended negatively charged organic particles and thus the addition of the cationic agent results in charge neutralization on the suspended particles. When the average charge is zero, or some other predetermined value, the dispersed organic particles undergo flocculation, i.e., aggregation, at an optimum rate. Too much cationic agent, however, creates positively charged organic particles which can be as difficult to flocculate as are the originally negatively charged particles.

To date, however, determining how much chemical to add to the stream to be treated has been difficult, especially since the composition of such streams often varies over fairly wide ranges in time intervals of a few minutes to a few hours.

Various empirical approaches to "finding" the correct dosage of flocculant to be added to a stream have been used. For example, increasing amounts of flocculant may be added to samples from the stream and the amount of decrease in turbidity of the stream noted, the correct dosage being determined as the one which causes the greatest decrease in turbidity with the least addition of flocculant.

Another approach is to use a so-called Zeta meter to determine the charge condition existing in the stream. The Zeta meter is used to observe the time required for a charged particle from the stream to pass a predetermined distance along a liquid path while under the influence of an electric field. This method is time consuming and requires a technician to perform the test and to interpret test results before the stream is treated with a greater, lesser, or the same amount of flocculant as had been used since the last previous Zeta meter test was made.

The usual methods of determining the dosage of flocculant to be added to a stream having suspended charged particles are discontinuous and require a substantial amount of individual labor in making the tests. The use of such tests in controlling flocculation of such streams is costly both from the standpoint of the labor involved and from the fact that the amount of flocculant actually required by the stream may vary from that indicated by the tests.

A principal object of this invention is to provide an improved instrument for developing, on a substantially continuous basis, an alternating current electrical signal which is a function of the charge condition existing in a stream containing charged particles therein.

In accordance with this invention there is provided apparatus for developing a continuous electrical signal, either current or potential, which is a function of the charge condition, existing in a stream containing charge influencing species therein.

Basically, the apparatus comprises a capillary element, or flow path means, which has walls which are substantially electrically insulating, means for advancing a sample stream through said capillary while surging the sample backward and forward through the capillary as the stream is advanced, a pair of substantially reversible electrodes, the electrodes being in the sample stream at spaced apart intervals usually across the ends of the capillary, and means for reading only the alternating current signal which is developed across said electrodes.

The invention, as well as additional objects and advantages thereof, will best be understood when the following detailed description is read in connection with the accompanying drawings, in which:

FIG. 2 is a diagrammatic view showing the instrument of FIG. 1 used in a titration operation.

Figure 1:
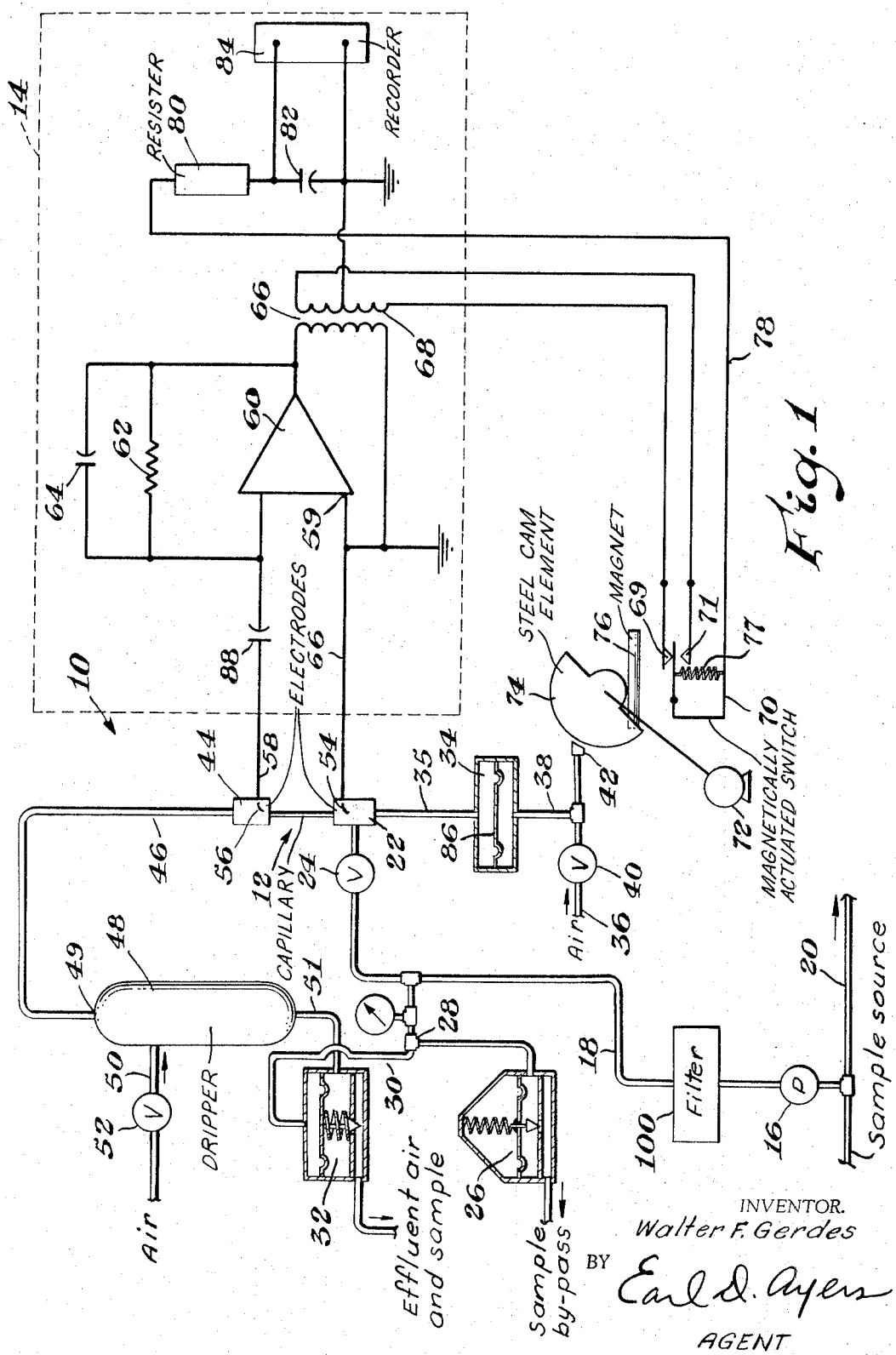
FIG. 1 is a diagrammatic view of an instrument made in accordance with this invention.

Referring to the drawing, there is shown apparatus for developing an electrical signal which is proportional to streaming current, indicated generally by the numeral 10, which comprises a capillary 12 having electrically insulating walls through which a sample stream is passed under pulsed flow conditions and apparatus, indicated generally by the numeral 14, for measuring the alternating current developed along the length of the capillary.

A sample pump 16, coupled to a sample source 20 which may be a process stream, for example, supplies a sample stream through the line 18 to the input end 22 of the capillary 12 under a nominal pressure of, for example, 20 pounds per square inch gauge pressure. A constricted part 24 is disposed between the line 18 and the input end 22 of the capillary. A back pressure regulator 26, coupled by the line 28 to the line 18 between the constricted part 24 and the pump 16, is set, for example, to maintain a pressure of 20 pounds per square inch gauge on the line 18. A line 30, coupled to the line 28, is coupled to a back pressure regulator 32 which is adapted to be set to maintain a predetermined pressure through it with respect to the pressure across the back pressure regulator 26. In the instant case, for example, the regulator 32 is adjusted to maintain a pressure which is three pounds less than the pressure at which sample is supplied to the constricted part 24, e.g. 17 p.s.i.g. (20—3.)

A diaphragm type pressure pulser 34 has its output coupled through the line 35 to the input end 22 of the capillary 12 and its input end coupled to a source 36 of air at about 40 p.s.i.g., for example, through a line 38 having a constriction 40 therein. A nozzle 42 is also coupled into the line 38 between the constriction 40 and the input of the diaphragm pulser 34. The output end 44 of the capillary 12 is coupled by means of a plastic line or tube 46 to a dripper device 48. The dripper 48 has the input from the line 46 and an air input 50 from a line having a constriction 52 therein coupled to it near its upper end 49. The output of the dripper 48 is fed by line 51 through the previously mentioned back pressure regulator 32 to a drain (not shown), or to re-enter the process stream.

The capillary 12 has electrodes 54, 56 disposed at the input and output ends 22, 44, respectively, in the path of the sample stream which passes into and out of the capillary 12. These electrodes though indicated as separate elements may be brass fittings into which the ends of the capillary are coupled.

The electrode 56 is coupled by means of the central lead 58 of a coaxial cable through a capacitor (8 microfarads capacity is satisfactory) to one input terminal of a high gain operational amplifier 60 which has sufficient feedback, by means of the resistor 62 and capacitor 64 coupled between its output and input circuits, to function as a milli-microammeter when a suitable meter or recorder is coupled to its output. The outer or shield conductor 66 of the coaxial cable is connected between the capillary electrode 54 and the grounded input terminal 59 of the operational amplifier 60.

The output of the operational amplifier 60 is coupled across the primary winding of a transformer 66. the secondary 68 has its center tap grounded and its end leads coupled to the throws 69, 71 of a magnetically controlled single pole double throw switch 70. The switch 70 is physically located adjacent to the valve 42 which is coupled to the line 38 leading to the diaphragm pulser 34. A synchronous motor 72, rotating at 225 r.p.m., for example, drives a rotatable cam 74 which is semi-circular in configuration and has its curved peripheral surface close spaced with respect to the orifice of the nozzle 42 during half of each revolution as the cam 74 rotates. The thickness of the cam 74 is equal to or greater than the width of the orifice of the nozzle 42. The cam 74, which is made of a magnetic material, also passes between a permanent magnet 76 and the magnetically controlled switch 70 as the cam rotates. The single pole of the switch 70 is coupled through the lead 78 and a resistance-capacitance filter 80, 82 to a suitable meter or recorder 84.

In operation, material from the sample source is pumped through the line 18 and the constriction 24 through the capillary 12, part of the sample being diverted, however, through the back pressure regulator and sample bypass device 26 whereby substantially constant sample material pressure is maintained on the side of the constriction 24 to which the line 18 is coupled.

As material from the sample source is being pumped through the capillary 12, the diaphragm pulser 34 is being actuated 225 times per minute as the motor 72 and thus the cam 74 rotates. During the time the peripheral surface of the cam 74 is closely adjacent to the orifice of the valve 42, thus substantially closing the orifice of the nozzle 42, air (at about 40 p.s.i.g.) passing through the constriction 40 in the line 38 tends to build up pressure in the line 38 and the input side of the diaphragm pulser 34, thus advancing the diaphragm 86 of the pulser 34 upwardly and forcing sample material (in addition to that pumped through the capillary 12 by the pump 16) through the capillary 12 at a pressure which is higher than the nominal 20 p.s.i.g. pressure maintained by the pump 16 and regulator 26. The constriction 24 tends to limit the amount of sample material which passes through it as the pressure on the diaphragm pulser 34 increases, assuring that the flow through the capillary will pulse upwardly during operation as the pressure increases.

After the generally semi-circular cam 74 rotates ½ revolution, its periphery no longer substantially blocks the orifice of nozzle 42, air is free to escape in much greater quantity from the orifice of the nozzle 42, thus reducing the input pressure to the pulser 34 and permitting the diaphragm 86 of the pulser 34 to return at a suitable rate to a neutral position. Both the size of the opening of the constriction 40 and orifice of the nozzle 42 are chosen to cause the diaphragm 86 to move into its expanded position and then return to the unpressured or neutral position at a time cycle rate at 225 cycles per minutes with the time for each half cycle being at least approximately equal.

Since back pressure is maintained on the dripper 48 and the line 46, sample material is pulsed downwardly through the capillary 12 as the diaphragm 86 of the pulser 34 is returning to its unpressured or neutral position. However, since the back pressure maintained on the dripper 48 (due to the back pressure regulator 32) is 3 pounds less than the pressure maintained on the input end of the capillary 12, there is a net forward flow through the capillary from the input end 22 to output end 44 even though the sample material is pulsed back and forth through the capillary.

The air entering the dripper 48 through the inlet 50 is fed through a needle valve 52 in a very small quantity which is only sufficient to maintain the required pressure head in the dripper 48.

Because the lead 58 is coupled to the input of the operational amplifier (which operates as a current measuring electrometer) in series with the capacitor 88, any direct current component of the signal developed across the capillary 12 is blocked and only the alternating signal produced by the sample material pulsing back and forth across the capillary is fed into the operational amplifier 60.

The output of the operational amplifier 60 is coupled across the primary winding of the transformer 66, as mentioned previously. Because it is desirable to couple the output signal to a direct current readout device such as a meter or recorder, for example, the magnetically actuated switch 70 is adapted to achieve full wave rectification of the transformer output appearing across the secondary winding 68. Rectification is accomplished by connecting the lead 78 alternately to each throw of the switch 70 in synchronism with the pulsing of sample material through the capillary 12.

The cam 74, which is made of magnetic material as mentioned previously, accomplishes this, for example, by rotating between the magnetically actuated switch 70 and a permanent magnet 76 disposed adjacent to the switch. During the half revolution when the cam shields the switch 70 from the field of the magnet 76, the switch is coupled to one throw due to the slight tension caused by the spring 77, for example. Then, when the cam rotates to a position whereby the magnetic field may influence the switch 70, the pole of the switch connected to the lead 78 is connected to the other throw of the switch. Thus, since rotation of the cam 74 controls both the pulsing rate at which the sample passes through the capillary 12 and the rate at which the secondary winding (68) output is switched, synchronous full wave rectification of the output of the operational amplifier 60 is easily accomplished.

The resistor 80 and capacitor 82 constitute a "brute force" filter to smooth the rectified output before it is coupled to the D.C. actuated readout device or recorder 84.

It should be emphasized that the operational amplifier type of milli-microammeter circuit may be replaced by other apparatus, such as an electrometer, for example, which will provide an amplified signal which is a function of the small current flow between the electrodes 54, 56.

The synchronous rectification afforded by the magnetically actuated switch 70 results in a direct current output signal which is phase sensitive. Other phase sensitive rectifying devices, such as a ring demodulator, for example, may be substituted for the synchronous rectifier.

If it is not required to know the polarity of the streaming potential which is measured, a non-synchronous type of rectification means may be used.

The dripper device 48 is used to eliminate electrical leakage paths between the two electrodes 54, 56 which might occur if the sample material leaving the capillary 12 were returned to the sample source in a continuous stream. However, if the sample flow path between the output end of the capillary 12 and the sample source is long enough to be a high resistance path as compared to the resistance of the path through the capillary, the dripper may under certain conditions be dispensed with.

The pump 16 should have an output pressure which is at all times at least equal to the pressure which the back pressure regulator is adjusted to maintain.

Using the instrument as a current measuring instrument makes the signal relatively less dependent on the ionic conductivity of the sample stream than is the case when the instrument is adapted to measure the potential developed across the electrodes 54, 56. For example, when the instrument is adapted to read current readings of the instrument are not adversely affected enough to become unreliable until the conductivity of the sample stream approaches the conductivity of a 3 percent sodium chloride water solution. The instrument may readily be adapted to read the developed potential by inserting a resistance of suitably high value (at least several megohms, usually) in series with the capacitor 88 and the input of the operational amplifier 60.

As an example of the amplitude of signals obtained with one instrument in accordance with this invention, tap water (Freeport, Tex. area) used as the sample stream developed signals of the order of $10^{-3}$ volt and $10^{-8}$ ampere. However, because the capacitor 88 isolates any noise signal resulting from dis-symmetry of the electrodes 54, 56 or drift signals, the small signals developed across the electrodes 54, 56 by the movement of the sample stream may readily be amplified by themselves.

When the instrument is to be calibrated, a standard sample from a source (not shown) is pumped through the line 18 in the same manner as is the regular sample. After the standard sample has pulsed through the capillary for a short time, the signal tends to stabilize at a set value which is a point at which the meter can be calibrated.

The standard sample may, for example, be a colloidal solution or dispersion wherein the average charge on the particles has previously been determined by other means, such as by a Zeta meter, for example, which measures electrophoretic mobility of charged particles. If calibration over a wide range is desired, the use of various standard samples may be used. If the instrument is to be calibrated for zero reading, the capillary is filled with water but with no flow through the capillary, the zero reading is made.

The capillary 12 may be made of polyethylene, polystyrene, nylon, beeswax, paraffin, or Teflon (polytetrafluoroethylene), for example. One capillary which has been used is composed of a ¾ inch length of ¼ inch diameter polytetrafluoroethylene rod having a hole drilled lengthwise through it with a No. 72 drill (.025 inch diameter).

Alternatives to the capillary 12 may be used. For example, polyethylene tubing having a length of 85 feet and an inner diameter of 3/16 inch has been successfully used. Also, polyethylene tubing having a length of 60 feet and an inner diameter of .062 inch has been successfully used.

It is good practice to provide a filter 100 in the line 18 and to provide means for back flushing the filter 42 (usually 30 to 60 micron filter) periodically. Such means comprise suitable valving arrangements whereby water may be pumped from the output end to the input end of the filter 42 (and thence to a drain, for example), but this type of arrangement is well known to those skilled in the art and is therefore not included in the drawing.

The apparatus heretofore described may be used to indicate the average charge density existing on particles present in the sample stream based either on the current or potential developed between the electrodes 54, 56. Typical sample streams may be raw water, sewage, a latex, or oil-water emulsions, for example.

This instrument provides a continuous measurement of the charge density present in the process stream, for example, whereas prior art instruments such as the so-called Zeta meter, require a considerably longer period of time and the constant attention of an operator to make a single determination of the charge present on a single particle which is present in a sample of the stream being studied.

In applications where it is desired to produce flocculation of the particles in the stream, the instrument is used to provide an indicaiton of the end point of a titration operation in which a flocculant material such as alum, ferric chloride, or a suitable polymer such as polyethylenimide, for example, is added to the stream as the streaming current (loosely speaking) is being measured by the instrument of this invention.

The use of the instrument of this invention in batch titration type operation is illustrated in FIG. 2.

Calibrated burettes 102, 104 are disposed with their valved lower ends above a reservoir 106 of distilled water or water of standardized salt content. The contents of the reservoir 106 are coupled to the streaming current instrument 108 by the line 110 and pump 112 (the line 110 and pump 112 corresponding generally to line 18 and pump 16 in FIG. 1). As the contents of the reservoir are pumped through the capillary (not shown) of the instrument in FIG. 2, the effluent is recycled through line 114 and dripper 116 to the reservoir 106. For the sake of convenience, a conventional recorder 118, adjusted to indicate current or potential on either side of a neutral point, is coupled to the output of the instrument 66.

In operation, a predetermined amount of a cationic treating material to be analyzed, such as polyethylenimine, for example, is dispensed from the burette 104 into the reservoir 106. Then, with the instrument 108 in operation, discrete amounts of a known standard anionic reagent, such as alkylbenzene sulfonate from the burette 102, are dispensed into the reservoir 106. The amount of anionic reagent required to neutralize the cationic material, as indicated by zero output on the instrument, is recorded. The strength of the cationic material is then conventionally calculated by multiplying the known strength of the anionic material by the volume of the anionic material dispensed into the reservoir 106 and dividing by the volume of the cationic material dispensed into the reservoir 106.

When titrating materials having charge influencing characteristics, an instrument reading of zero is not always obtained at the equivalence point because of the aggressiveness of the materials. Since, in general, the exact deviation of the equivalence point from zero reading to be expected when titrating one material with another will be unknown, the trick of making a second titration right on top of a first is very useful in titrating charge. First, an aliquot of sample is titrated to the neutral point or zero microamps as indicated by the instrument. Then a second of the same volume is added to the neutral mixture and the composite is titrated. The first titration is ignored and the second is taken as the true titer of the sample.

The procedure described above is useful in quality control operations, for example, in which different batches of product must be compared to determine their relative effectiveness, as in the case of cationic flocculants, for example.

The range of the recorder 118 is chosen to match the signal developed in the instrument 108, which potential is influenced by factors such as pressure at the capillary and the expected range of streaming current of the sample.

While the capillary 12 and the tubes disclosed as capillarly substitutes have been described as being composed of electrically insulating material, it is acknowledged that capillaries having metal inner walls which are very thin may be used. Such metal walled capillaries have such a thin coating of metal that actually, though the walls are not made of insulating material, a high resistance electrical path does exist between the ends of the capillary. Thus, depending on the sensitivity of other equipment of the instrument such a capillary may prove practicable for use in this invention.

While the pressure under which material is forced through the capillary or capillary equivalent has been mentioned heretofore, the pressure is merely the means to produce a flow rate through the capillary or its equivalent which causes a useful signal to be developed.

What is claimed is:

1. Apparatus for determining a function of the charge condition which is present in a system which includes liquid which contains charge influencing species, comprising tubular flow path means having a free flow path therethrough and having electrically insulating walls, length, and an input and output to and from said flow path means for entry and exit of said liquid, a pair of electrodes, said electrodes being so disposed as to contact liquid flowing through said flow path means, the electrodes being spaced apart from one another with one electrode being upstream of the other, the space between said electrodes including at least part of the length of said flow path means, means for providing forward and reverse flow of said liquid in a cyclical manner along said flow path means between said electrodes, signal utilization means, and means for coupling alternating signal components developed across said electrodes to said signal utilization means.

2. Apparatus in accordance with claim 1, wherein said flow path means includes a capillary tube having walls and extends between said electrodes.

3. Apparatus in accordance with claim 1, wherein said means for coupling alternating signal components comprises a capacitor connected in series with leads coupling the electrodes to said utilization means.

4. Apparatus in accordance with claim 1, wherein said signal utilization means comprises a meter.

5. Apparatus in accordance with claim 1, wherein said signal utilization means comprises an amplifier having an output circuit, means coupled to said output signal for rectifying a signal developed across said output circuit, and a direct current actuated readout device coupled to said means for rectifying.

6. Apparatus in accordance with claim 5, wherein said rectifying means is phase sensitive.

7. Apparatus in accordance with claim 1, wherein said flow path means comprises an elongated tube.

8. Apparatus in accordance with claim 2, wherein the walls of said capillary tube are Teflon.

9. Apparatus in accordance with claim 2, wherein the walls of said capillary tube are polyethylene.

10. Apparatus in accordance with claim 2, wherein the walls of said capillary tube are polystyrene.

11. Apparatus in accordance with claim 2, wherein the walls of said capillary tube are Nylon.

12. Apparatus in accordance with claim 2, wherein the walls of said capillary tube are a solid wax.

13. Apparatus in accordance with claim 1, wherein said means for providing forward and reverse flow provides more forward flow than reverse flow.

14. Apparatus in accordance with claim 1, wherein said means for providing forward and reverse flow includes a pressure pulser device coupled to the input of said flow path means and back pressure maintaining apparatus coupled to the output of said flow path means.

15. Apparatus in accordance with claim 6, wherein said rectifying means is a synchronous rectifier.

16. Apparatus in accordance with claim 1, wherein said means for providing forward and reverse flow of said liquid comprises a pump, a flow line constriction device having an input part and an output part, a first back pressure regulator, a cyclically actuated pressure pulser device, and differential back pressure apparatus, said pump having an input which is coupled to a source of sample and an output which is coupled to the input part of said flow line constriction device, said first back pressure regulator being coupled between said pump output and constriction device, the output part of said constriction device and said pressure pulser apparatus each being coupled to the input of said flow path means, said differential back pressure apparatus being coupled to the output of said flow path means.

17. Apparatus in accordance with claim 16, wherein said signal utilization means includes an amplifier having an output circuit, synchronous rectifying means coupled to said output circuit, said rectifying means including a reversing double throw switch, means for synchronizing the reversing of said double throw switch with the change in direction of flow of said liquid through said flow path means, and readout means coupled to said rectifying means.

18. Apparatus in accordance with claim 1, wherein said electrodes are reversible electrodes.

19. Apparatus in accordance with claim 17, wherein said double throw switch is a magnetically actuated switch, said switch having a magnet spaced therefrom, said cyclically actuated pressure pulser is pneumatically operated and is coupled to a pressurized gas line, and a single rotatable semi-disc of magnetic material disposed between said magnet and said switch with its periphery adjacent to an orifice in said gas line, whereby on rotation the semi-disc alternately permits and then restricts the flow of gas through said orifice and alternately shields from the switch and then exposes the switch to the magnetic field of said magnet.

20. Apparatus for determining the charge condition which is present in flowable material comprising liquid and charged particles, said apparatus comprising a flow path means having a free flow path therethrough and having electrically insulating walls, length, and an input and output for the liquid, a pair of electrodes, said electrodes being disposed along the path of flow of liquid passing through said flow path means and adapted to contact material flowing through said flow path means, the electrodes being spaced apart from one another, the space between said electrodes including at least a part of of the length of said flow path means, means for repetitively providing forward and reverse movement of said flowable material along said flow path in contact with the part of said insulating walls disposed between and adjacent to said electrodes, and means for coupling signal components developed across said electrodes to a signal utilization means.

21. Apparatus in accordance with claim 20, wherein said electrodes are disposed in fixed spaced apart relationship to said insulating walls of said flow path means.

22. Apparatus in accordance with claim 20, wherein said means for coupling signal components includes a capacitor connected in series with one of said electrodes.

References Cited

UNITED STATES PATENTS

| | | | |
|---|---|---|---|
| 2,644,900 | 7/1953 | Hardway | 324—29 X |
| 2,661,430 | 12/1953 | Hardway | 340—13 |
| 2,769,929 | 11/1956 | Hardway | 324—71 |

RUDOLPH V. ROLINEC, *Primary Examiner.*

WALTER L. CARLSON, *Examiner.*

C. F. ROBERTS, *Assistant Examiner.*